(12) United States Patent
Tian et al.

(10) Patent No.: US 7,078,580 B2
(45) Date of Patent: Jul. 18, 2006

(54) PROCESS FOR SEPARATING AROMATICS BY EXTRACTIVE DISTILLATION AND A COMPOSITE SOLVENT USED THEREIN

(75) Inventors: Longsheng Tian, Beijing (CN); Wencheng Tang, Beijing (CN); Ming Zhao, Beijing (CN); Yunming Zhang, Beijing (CN); Zhifeng Bian, Beijing (CN); Huixia Sun, Beijing (CN); Shijin Wu, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 229 days.

(21) Appl. No.: 10/184,751

(22) Filed: Jun. 28, 2002

(65) Prior Publication Data
US 2003/0080028 A1 May 1, 2003

(30) Foreign Application Priority Data
Jun. 29, 2001 (CN) .............................. 01 1 19818

(51) Int. Cl.
  C10C 7/10 (2006.01)
  C10C 7/17 (2006.01)
(52) U.S. Cl. ............... 585/833; 585/857; 585/860; 208/313; 208/321; 208/323; 208/326; 208/330
(58) Field of Classification Search ............... 585/833, 585/857, 860; 208/313, 321, 323, 326, 330
See application file for complete search history.

(56) References Cited

U.S. PATENT DOCUMENTS 3,816,302 A 6/1974 Paret ........................ 585/808
4,664,783 A 5/1987 Preusser et al. ............ 208/313
5,310,480 A 5/1994 Vidueira ..................... 208/313
5,877,385 A * 3/1999 Lee et al. .................... 585/807

FOREIGN PATENT DOCUMENTS

| CN | 1262264 | 8/2000 |
| EP | 0418622 | 3/1991 |
| SU | 859344 | 8/1981 |

OTHER PUBLICATIONS

English Language Abstract of CN1262264.
English Language Abstrcat of E.P.O.0418622.
English Language Abstract SU 859344.

* cited by examiner

Primary Examiner—Tam M. Nguyen
(74) Attorney, Agent, or Firm—Scully, Scott, Murphy & Presser, P.C.

(57) ABSTRACT

This application relates to a composite solvent for separating aromatics by extractive distillation, comprising a main solvent, a solutizer and a modifier. Said solutizer is selected from any one or mixtures of any two of $C_8$–$C_{11}$ aromatics having different number of carbon atoms, the content of which is 3–39 wt %, and the number of carbon atoms of the lowest aromatic in the solutizer should be greater than that of the highest aromatic in the aromatics to be separated. When the solutizer is selected from any one of $C_8$–$C_{11}$ aromatics, the composite solvent contains 0.01–10.0 wt % of the modifier; when the solutizer is selected from mixtures of any two of $C_8$–$C_{11}$ aromatics having different number of carbon atoms, the composite solvent contains 0–10.0 wt % of the modifier. Said main solvent and modifier are independently selected from sulfolane derivatives, N-formyl morpholine, and N-methyl pyrrolidone, provided that the acidity and basicity of the modifier are opposite to those of the main solvent. When the composite solvent is used to recover aromatics by extractive distillation, it is possible to moderate the operation conditions of solvent recovery, increase the yield of aromatics, and make the separated aromatics to be neutral.

6 Claims, 1 Drawing Sheet

PROCESS FOR SEPARATING AROMATICS BY EXTRACTIVE DISTILLATION AND A COMPOSITE SOLVENT USED THEREIN

TECHNICAL FIELD

The present invention relates to a composite solvent for separating aromatics from hydrocarbon mixtures by extractive distillation.

BACKGROUND ART

Most of the processes for separating aromatics from hydrocarbon mixtures such as catalytically reformed gasoline or hydrogenated pyrolysis gasoline are liquid-liquid extraction and extractive distillation, in which the most commonly used selective solvents in liquid-liquid extraction are glycerols or sulfolane derivatives. Although the liquid-liquid extraction process can obtain benzene, toluene, and xylene (BTX) product having high purity with a high yield, the prior liquid-liquid extraction processes are only suitable for treating feedstocks containing 30–70 wt % of aromatics. When treating feedstocks containing aromatics more than 70 wt %, raffinate oil has to be added; thereby, more energy is consumed and the efficiency of the device is lowered.

Extractive distillation is a process for separating aromatics from hydrocarbon mixtures which takes advantage of the solvent having the different effects on the relative volatility of various components in hydrocarbon mixture. There is no need to add raffinate oil into hydrocarbon mixtures when feedstocks containing high content of aromatics are treated. The solvent used is generally pure N-formyl morpholine, N-methyl pyrrolidone, or sulfolane, etc. For example, U.S. Pat. No. 5,310,480 (incorporated by reference in its entirety) disclosed a process for separating aromatics by extractive distillation, which uses only one column containing a reboiler and a cyclone to separate aromatics from non-aromatics in the feedstock. The upper section of said column is used for extractive distillation, and the lower section is used for recovering solvent. In order to enhance the selectivity and moderate the severity in solvent recovery, 0.1–20 wt % of water is added into the selective solvents such as sulfolane derivatives, glycerols, or glycerol ethers, while the procedure of solvent recovery is performed by means of steam stripping. Said patent teaches that the selective solvent for aromatics may be a composite solvent, wherein one component is a polyalkylene glycerol having low molecular weight, and another component is a glycerol ether, and the mutual solubility of the two components is 0.1–99 wt %. The aromatics obtained from this extractive distillation process cannot directly serve as a product for containing water, due to the water-containing solvent and the steam stripping used therein; therefore, further distillation is needed. Two liquid phases are readily formed when a feedstock which a low content of aromatics is subjected to extractive distillation due to the restriction of the solubility in the water-containing solvent, which thereby affect the normal operation. In addition, the water contained in the system tends to cause corrosion of the device.

CN1262264A disclosed a combined process of extractive distillation and liquid-liquid extraction, which pre-distillates the feedstock to yield a first fraction containing benzene and a second fraction containing small amount of benzene. The first fraction is subjected to extractive distillation to yield the benzene product, and the second fraction is mixed with the raffinate obtained from extractive distillation and then is subjected to liquid-liquid extraction to obtain toluene and a small amount of benzene. This process has less restriction on the feedstock, broader applicability, lower energy consumption, and can recover BTX simultaneously, which is therefore suitable for expending and reforming of the existing liquid-liquid extraction devices in the refinery. In said patent, 0.1–15 wt % of $C_8$–$C_{10}$ aromatics are added into the selective solvent for separating benzene by extractive distillation as a solutizer to increase the solubility of the solvent, which thereby avoids the adverse effect of water on the recovery of benzene, since both the solvent and the system contain no water. However, said invention only puts the situation where o-xylene serves as a solutizer into practice, and is limited within the extractive distillation of a combined process.

In the prior processes of using a single extractive distillation solvent, the temperature of the recovery column cannot be too high due to the restriction of the decomposition temperature of the solvent during the recovery of solvent; therefore, the level of vacuum should be raised to ensure a thorough separation of the solvent and aromatics in the rich solvent; as a result, the operation severity of the recovery column is relatively high. Besides, the extractive distillation solvent often contains O, N, or S atoms since a certain polarity is required to increase the selective solubility of aromatics; therefore, the distillation solvent has certain weak acidity or basicity, which imparts the aromatic product having corresponding weak acidity or basicity. Therefore, the product thus obtained has to be subjected to a post treatment to neutralize the acidity or basicity.

SUMMARY OF THE INVENTION

The object of the present invention is to provide a composite solvent well in aromatics separation by extractive distillation. Such a composite solvent has a higher solubility and relatively wide boiling range so that the operation conditions in solvent recovery can be moderated and the energy consumption is reduced.

DETAILED DESCRIPTION OF THE INVENTION

Figure 1:
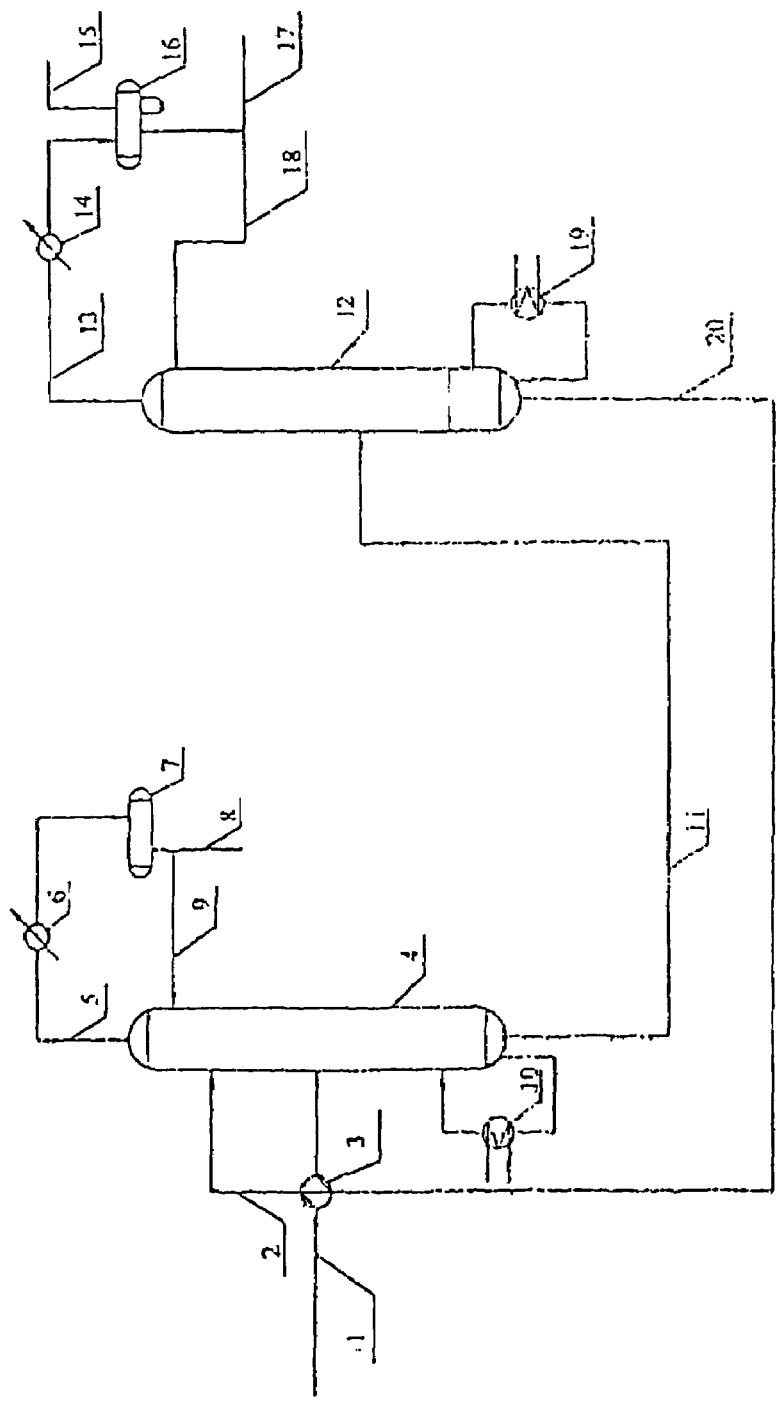
FIG. 1 is a schematic process flow diagram of the extractive distillation process using the composite solvent according to the present invention.

The composite solvent according to the present invention comprises a main solvent, a solutizer and a modifier. Said solutizer is selected from any one or a mixture of any two of $C_8$–$C_{11}$ aromatics having different number of carbon atoms, the content of which is 3–39 wt %; the number of carbon atoms of the lowest aromatic in the solutizer should be greater than that of the highest aromatic in the aromatics to be separated. When the solutizer is selected from any one of $C_8$–$C_{11}$ aromatics, the composite solvent contains 0.01–10.0 wt % of the modifier, and when the solutizer is selected from mixtures of any two of $C_8$–$C_{11}$ aromatics having different number of carbon atoms, the composite solvent contains 0–10.0 wt % of the modifier. Said main solvent and modifier are independently selected from sulfolane derivatives, N-formyl morpholine, and N-methyl pyrrolidone, provided that the acidity and basicity of the modifier are opposite to those of the main solvent.

The main solvent and modifier can be selected from sulfolane derivatives, N-formyl morpholine, and N-methyl pyrrolidone respectively. Said sulfolane derivatives have the following formula:

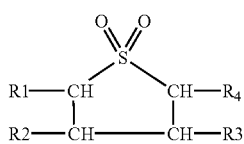

wherein, each of R1, R2, R3, R4 is independently selected from H, C1–C10 alkyl, C7–C12 arylalkyl, C1–C8 alkoxy. The preferred solvent is sulfolane, 2-methyl sulfolane or 2,4-dimethyl sulfolane.

The solutizer in the composite solvent according to the present invention can increase the solubility. The selection thereof depends on the composition of the aromatics to be separated; that is, the solutizer should have a structure similar to that of the aromatics to be separated so as to increase the solubility of the aromatics. However, the solutizer should also differ from the aromatics to be separated so as to facilitate recovery of the solvent. Generally, all of the aromatic-containing feedstocks contain benzene and toluene; therefore, the solutizer can be selected from any one or mixtures of any two of $C_8$–$C_{11}$ aromatics. However, when the feedstock contains xylene, the solutizer should be selected from aromatics higher than $C_9$, preferably $C_9$ aromatics or mixtures of $C_9$ and $C_{10}$ aromatics.

Addition of the modifier into the composite solvent can solve the deviation of the separated aromatics from neutrality caused by the main solvent. For instance, when sulfolane is used as a main solvent, the separated aromatic product is also weakly acidic as sulfolane is weakly acidic per se, therefore a post treatment of the product is needed to neutralize its acidity. For the same reason, when weakly basic N-formyl morpholine and N-methyl pyrrolidone is used as the main solvent, the separated product is also weakly basic; therefore, an acid treatment of the product is needed to neutralize basicity thereof. If an extraction solvent an acidity-basicity opposite to that of the main solvent is added into the composite solvent as a modifier, the separated aromatic product is allowed to be neutral so that the post treatment can be avoided. Specifically speaking, when sulfolane serves as the main solvent, the modifier is selected from N-formyl morpholine and N-methyl pyrrolidone; when N-formyl morpholine or N-methyl pyrrolidone serve as the main solvent, the modifier is sulfolane.

When the solutizer is selected from any one of $C_8$–$C_{11}$ aromatics, said aromatics refers to one of the aromatics having the same number of carbon atoms or a mixture of isomers such as C8 aromatics including o-xylene, m-xylene, p-xylene, ethyl benzene or mixed xylene, $C_9$ aromatics including isopropyl benzene, trimethyl benzene. The solutizer content in the composite solvent is preferably 5–30 wt % and the modifier content is preferably 0.1–5.0 wt %.

When the solutizer is selected from mixtures of any two of $C_8$–$C_{11}$ aromatics having different number of carbon atoms, the solutizer content in the composite solvent is preferably 5–30 wt %, and the modifier content is preferably 0–5.0 wt %, more preferably 0.1–5.0 wt %. The mixtures of any two of $C_8$–$C_{11}$ aromatics having different number of carbon atoms in said solutizer are preferably the mixtures of $C_{8+n}$ and $C_{9+n}$ aromatics, wherein n is 0, 1, or 2. The $C_{8+n}/C_{9+n}$ aromatic weight ratio is 1–50:1, preferably 1–20:1, and more preferably 1.5–15.0:1.

The composite solvent according to the present invention is suitable for the extractive distillation process. Suitable feedstocks for extractive distillation are the hydrogenated pyrolysis gasoline fraction, reformed oil, coal tar oil, in which the aromatic contents at 15–99 wt %. The feedstocks are preferably hydrocarbon mixtures containing one or two aromatics, such as the feedstocks containing benzene, benzene and toluene, or toluene and xylene.

The process for separating aromatics by extractive distillation using the composite solvent according to the present invention comprises:

introducing the composite solvent to the upper part of an extractive distillation column, introducing the hydrocarbon mixture to the middle of the column, withdrawing the non-aromatics from the top of the extractive distillation column, introducing the rich solvent containing aromatics from the bottom of the extraction column to the middle of a solvent recovery column to separate aromatics and the composite solvent, withdrawing the aromatics thus obtained from the top of the recovery column, and introducing the composite solvent withdrawn from the bottom of the solvent recovery column into the top of extractive distillation column from recycling.

The operation conditions of the extractive distillation column in the above extractive distillation procedure are the top pressure of 0.10–0.30 MPa, the inlet temperature of the lean solvent is 80–130° C., the bottom temperature is 130–180° C., the solvent/feed weight ratio, i.e., the ratio of solvent is 3.0–7.0, the reflux ratio is 0.1–3.0, and the theoretical plate number is 10–40; the top pressure of the recovery column is 0.04–0.10 MPa, the inlet temperature of the rich solvent is 125–175° C., the bottom temperature is 160–190° C., the reflux ratio is 0.5–2.5, and the theoretical plate number is 10–25.

As an example, the process flow with the separation of benzene by extraction distillation will be described below referring to FIG. 1. The feedstock for extractive distillation enters heat exchanger 3 via line 1, then enters the middle of extraction distillation column 4 after heat exchanging to a certain temperature. The composite solvent enters the extractive distillation column from the upper part via line 2. By extractive distillation, the non-aromatics are withdrawn from the top via line 5 and enter condenser 6. After condensating and cooling, the non-aromatics enter reflex tank 7, a part of which is refluxed into extractive distillation column 4 via line 9, and the other part leaves the device as raffinate oil via line 8. The rich solvent from the bottom of the extractive distillation column 4 enters solvent recovery column 12 via line 11. The gas stream at the top of solvent recovery column 12 enters condenser 14 via line 13 for condensation, and enters condensate tank 16 after cooling. A part of condensate is refluxed into the solvent recovery column via line 18, the other part leaves the device as a benzene product via line 17. The top of condensate tank 16 is connected to vacuum system 15. The lean solvent obtained from the bottom of solvent recovery column 12 enters heat exchanger 3 via line 20 and recycle to extractive distillation column 4 after heat exchange. Both extractive distillation column 4 and solvent recovery column 12 are equipped with reboilers 10 and 19 at the bottom.

In case of the simultaneous recovery of benzene/toluene by extractive distillation, the feedstock is $C_6$–$C_7$ fraction and the flow is the same as the above except that a mixture of benzene/toluene is obtained from the top of the recovery column. Pure benzene and pure toluene can be obtained by further rectification separation of the mixture. In case of separation of xylene from $C_8$ fraction, the operation is the same as that for the recovery of benzene except that the solutizer used is the aromatics higher than $C_9$. In case of the simultaneous recovery of toluene/xylene, the operation is the same as that for the simultaneous recovery of benzene/toluene, except that the solutizer used is the aromatics higher than $C_9$.

The composite solvent according to the present invention significantly enhances the solubility of the composite solvent owing to the addition of the solutizer, enabling the composite solvent to have sufficiently high recovery rate when used to recover aromatics from the feedstock with low aromatic content and thereby enlarges the applicable area of the device. The addition of the solutizer can also greatly moderate the operation conditions of the solvent recovery column, which can thereby reduce the adverse effect of the impurities such as sulfur, nitrogen, oxygen produced by the thermal decomposition of the solvent on the quality of the product. In addition, the addition of the modifier can ensure the neutrality of the aromatic product, and thereby the post treatment can be omitted.

The composite solvent according to the present invention contains no water and the solvent recovery column does not use stripping water either, so that the aromatic product can be obtained directly without the water separation device; therefore, not only the cost and energy can be saved, but also the corrosion of the device by water can be avoided.

EXAMPLES

The following Examples further illustrate this invention. These Examples are not intended to limit the scope of the invention Example 1

Benzene was recovered from the benzene fraction in hydrogenated pyrolysis gasoline. The composition of the feedstock used is shown in Table 2. The composite solvent used consisted of sulfolane as the main solvent, o-xylene and isopropyl benzene as the solutizers, and N-formyl morpholine as the modifier. The contents of various components in the composite solvent are shown in Table 1. The process in FIG. 1 was used. The operation conditions of the extractive distillation column and the solvent recovery column are shown in Table 3. The results on the aromatic separation are shown in Table 4.

Example 2

A benzene product was recovered from $C_6$ fraction of reformed oil through the process flow in FIG. 1. The main solvent of the composite solvent was sulfolane, the solutizers were o-xylene and isopropyl benzene, and the modifier was N-methyl pyrrolidone. The composition of the composite solvent is shown in Table 1. The composition of the feedstock is shown in Table 2. The operation condition of the extractive column and the solvent recovery column are shown in Table 3. The results of the aromatic separation are shown in Table 4.

Tables 3 and 4 show that the extractive distillation of the reformed oil with lower aromatic content using the composite solvent according to the present invention can not only be steadily operated and controlled under mild conditions but also produce the benzene product having a purity of 99.99%, and a sulfur content of 0.2 ppm with a high recovery rate of 99.6%. The content of aromatics in the raffinate was as low as 0.32%.

Example 3

Benzene was recovered from the benzene fraction in hydrogenated pyrolysis gasoline. The applied feedstock and operation conditions were similar to those in Example 1; except that the main solvent in the composite solvent was sulfolane, the solutizers were o-xylene and isopropyl benzene, and no modifier was added. The composition of the composite solvent is shown in Table 1. The results on the aromatic separation are shown in Table 4.

Example 4

Benzene was recovered from the benzene fraction of hydrogenated pyrolysis gasoline. The feedstock and operation conditions used were similar to those in Example 1; except that the main solvent in the composite solvent was sulfolane, the solutizer was o-xylene and the modifier was N-formyl morpholine. The composition of the composite solvent is shown in Table 1. The results on the aromatic separation are shown in Table 4.

Comparative Example

Benzene was recovered from the benzene fraction of hydrogenated pyrolysis gasoline. The feedstock and operation conditions used were similar to Example 1, except that the composite solvent described in CN1262264A with sulfolane as the main solvent and o-xylene as the solutizer was used. The composition of the composite solvent is shown in Table 1. The operation conditions of the extractive distillation column and the solvent recovery column are shown in Table 3. The results on the aromatic separation are shown in Table 4.

It can be seen from the date of Example 3 and the Comparative Example shown in Table 4 that compared to the composite solvent containing only one solutizing component according to CN1262264A, the composite solvent containing two solutizing components according to the present invention could enhance the recovery rate of the benzene product under the same operation parameters. The data of Example 4 show that the addition of the modifier into the composite solvent could reduce the content of sulfur in the benzene product and meet the requirement for neutrality. The data of Examples 1 and 2 show that the composite solvent containing two solutizers and a modifier offer better effects, which could not only enhance the recovery rate of aromatics but also reduce the content of sulfur, and allow the benzene product to be neutral. The trace amount of acidic substances in the neutral benzene product may not be removed from the neutral benzene product by post treatment, thereby the procedure is saved.

Example 5

Benzene and toluene were simultaneously recovered from the $C_6$–$C_7$ fraction of hydrogenated pyrolysis gasoline. The process flow shown in FIG. 1 was employed for extractive distillation and the obtained mixture of benzene/toluene entered the rectification column and converted to the benzene and toluene products through rectification. The main solvent in the composite solvent used in the extractive distillation column was N-formyl morpholine, the solutizers were o-xylene and isopropyl benzene, and the modifier was sulfolane. The composition of the composite solvent is shown in Table 1. The composition of the feedstock is shown in Table 2. The operation conditions of the extractive distillation column and the solvent recovery column are shown in Table 3. The results on the aromatic separation are shown in Table 5.

It can be seen from the data of Tables 3 and 5 that mixed aromatics benzene/toluene having a purity of 99.9% could be obtained under relatively mild conditions: a top residual pressure of 0.045 MPa, a top temperature of 72° C., and a bottom temperature of 186° C. in the solvent recovery column; and the product thus obtained was neutral. The benzene product and toluene product meet the requirement of high quality standard of GB3405-89 and GB3406-90 respectively. If pure N-formyl morpholine is used as the solvent for extractive distillation, the residual pressure of the recovery column should be 0.038 MPa and the bottom temperature should be 201° C. to obtain the same purity of the aromatics and the same recovery rate, and the content of nitrogen in the mixed aromatics will be as high as 2–3 ppm, which will lead to a much higher content of nitrogen in the toluene product and exhibit a relatively high basicity. Thus, a post treatment such as adsorptive purification of the product with clay has to be employed so as to produce a neutral product.

TABLE 1

| | Composition of composite solvent | | | |
|---|---|---|---|---|
| Example No. | Main solvent, wt % | Solutizer, wt % | | Modifier, wt % |
| 1 | Sulfolane, 84.0 | o-xylene, 11.0 | Isopropyl benzene, 4.0 | N-formyl morpholine, 1.0 |
| 2 | Sulfolane, 75.0 | o-xylene, 17.0 | Isopropyl benzene, 5.0 | N-methyl pyrrolidone 3.0 |
| 3 | Sulfolane, 85.0 | o-xylene, 14.0 | Isopropyl benzene, 1.0 | — |
| 4 | Sulfolane, 84.0 | o-xylene, 15.8 | — | N-formyl morpholine, 0.2 |
| 5 | N-formyl morpholin, 86.0 | Mixed xylene 6.0 | Isopropyl benzene, 3.5 | Sulfolane, 4.5 |
| Comparative Example | Sulfolane, 94.0 | o-xylene, 6.0 | — | — |

TABLE 2

| Composition of feedstock, wt % | Example 1 | Example 2 | Example 5 |
|---|---|---|---|
| Alkanes | | | |
| $C_5$ | — | 3.56 | 0.44 |
| $C_6$ | 4.45 | 35.40 | 3.89 |
| $C_7$ | 1.94 | 16.99 | 3.02 |
| Cyclane | | | |
| $C_5$ | 1.51 | 0.33 | — |
| $C_6$ | 9.20 | 2.85 | 8.24 |
| $C_7$ | 2.27 | 0.88 | 3.34 |
| MCH | 0.83 | — | — |
| Aromatics | | | |
| $C_6$ | 79.80 | 39.88 | 51.52 |
| $C_7$ | — | 0.01 | 29.55 |
| Total | 100.00 | 100.00 | 100.00 |

TABLE 3

| Items | Example 1 | Example 2 | Example 5 | Comparative Ex. |
|---|---|---|---|---|
| Extractive distillation | | | | |
| Theoretical plate number | 29 | 25 | 38 | 29 |
| Solvent ratio | 4.5 | 4.0 | 5.5 | 4.5 |
| Inlet solvent temperature, ° C. | 90 | 90 | 115 | 90 |
| Top reflux ratio | 0.3 | 0.3 | 0.7 | 0.3 |
| Top pressure, MPa | 0.1 | 0.1 | 0.15 | 0.1 |
| Bottom temperature, ° C. | 132 | 138 | 175 | 130 |
| Solvent recovery column | | | | |
| Theoretical plate number | 16 | 16 | 16 | 16 |

TABLE 3-continued

| Items | Example 1 | Example 2 | Example 5 | Comparative Ex. |
|---|---|---|---|---|
| Inlet solvent temperature, °C. | 131 | 136 | 174 | 130 |
| Top reflux ratio | 1.0 | 1.5 | 1.5 | 1.0 |
| Top pressure, MPa | 0.045 | 0.08 | 0.045 | 0.045 |
| Top temperature, °C. | 56 | 72 | 72 | 56 |
| Bottom temperature, °C. | 175 | 170 | 186 | 175 |

TABLE 4

| Items | Example 1 | Example 2 | Example 3 | Example 4 | Com. Ex. |
|---|---|---|---|---|---|
| Benzene product Purity, wt % | 99.97 | 99.99 | 99.97 | 99.97 | 99.97 |
| Non-aromatics, ppm | 300 | 100 | 290 | 300 | 300 |
| Sulfur, ppm | 0.2 | 0.2 | 0.5 | 0.3 | 1 |
| Crystallization point, °C. | 5.49 | 5.50 | 5.49 | 5.49 | 5.49 |
| Neutrality test | Neutral | Neutral | Weak acid | Neutral | Weak acid |
| Recovery rate, wt % | 99.86 | 99.60 | 99.87 | 99.88 | 99.66 |
| Non-aromatic product | | | | | |
| Aromatics, wt % | 0.54 | 0.32 | 0.51 | 0.47 | 1.33 |
| Solvent, ppm | <1 | <1 | <1 | <1 | <1 |

TABLE 5

| Items | Example 5 |
|---|---|
| Aromatic product (benzene + toluene) | |
| Purity, wt % | 99.90 |
| Non-aromatics, ppm | 1000 |
| Nitrogen, ppm | <0.5 |
| Neutrality test | Neutral |
| Recovery rate, wt % | 99.6 |
| Non-aromatic product | |
| Aromatics, wt % | 0.65 |
| Solvent, ppm | <1 |

What is claimed is:

1. A composite solvent for separating aromatics from hydrocarbon mixtures by extractive distillation consisting of a main solvent, a solutizer and a modifier; wherein said solutizer is a mixture of any two of $C_8$–$C_{11}$ aromatics having different numbers of carbon atoms, the content of which is 3–39 wt %, the number of carbon atoms of the aromatic with the lower carbon atom number in the solutizer being greater than that of the aromatic with the highest carbon atom number in the aromatics to be separated, the composite contains 0–10 wt % of the modifier, said main solvent and modifier are independently selected from the group consisting of sulfolane derivatives, N-formyl morpholine, and N-methyl pyrrolidone, provided that the acidity and basicity of the modifier are opposite to those of the main solvent, and said derivatives have the following formula

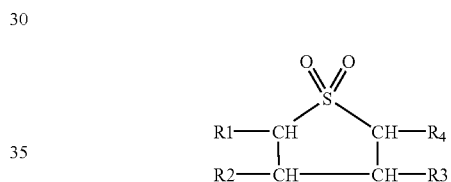

wherein, each of R1, R2, R3, R4 is independently selected from the group consisting of H, $C_8$–$C_{10}$ alkyl, $C_7$–$C_{12}$ arylalkyl, $C_1$–$C_8$ alkoxy.

2. The composite solvent according to claim 1 wherein the content of said solution is 5–30 wt % and the content of said modifier is 0.01–5.0 wt %.

3. The composite solvent according to claim 1 or 2 wherein said solutizer is a mixture of $C_{8+n}$/$C_{9+n}$ aromatics, and the weight ration of $C_{8+n}$/$C_{9+n}$ aromatics is 1–20:1, wherein n is 0, 1 or 2.

4. The composite solvent according to claim 3 wherein the weight ratio of $C_{8+n}$/$C_{9+n}$ aromatics is 1.5–15.0:1.

5. The composite solvent according to any one of claim 1 or 2 wherein the main solvent is sulfolane and the modifier is selected from the group consisting of N-formyl morpholine and N-methyl pyrrolidone.

6. The composite solvent according to any one of claim 1 or 2 wherein the main solvent is selected from the group consisting of N-formyl morpholine and N-methyl pyrrolidone and the modifier is sulfolane.

* * * * *